Nov. 1, 1966  S. FORDHAM  3,281,930
JOINING CLAD METAL PARTS
Filed Oct. 24, 1963
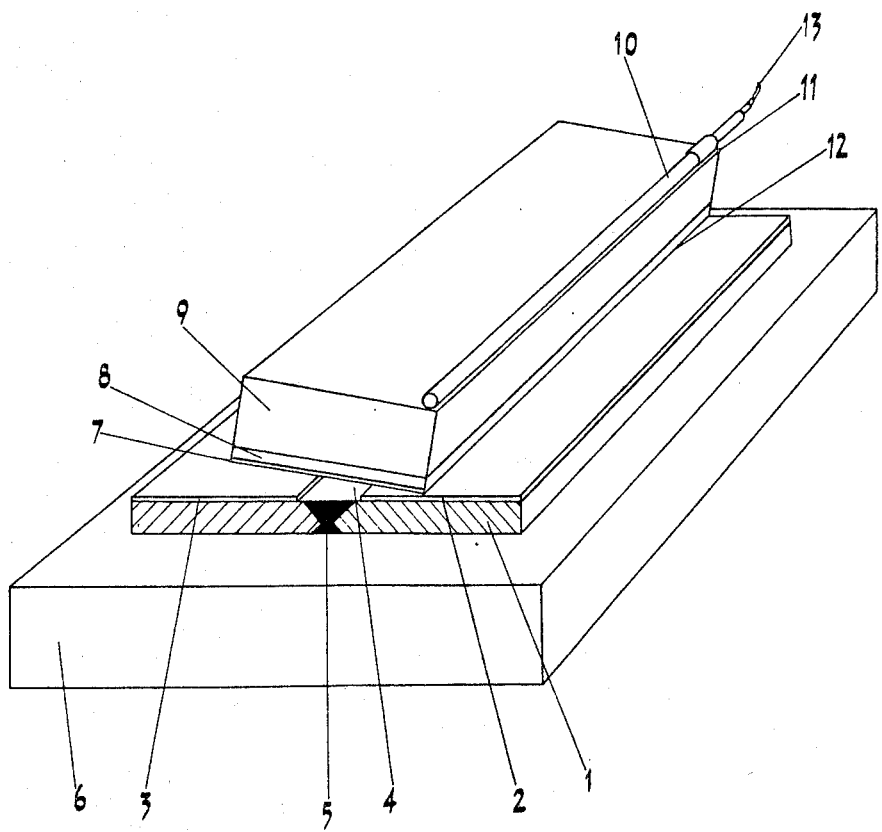
INVENTOR
STANLEY FORDHAM
By Cushman, Darby & Cushman
ATTORNEYS

United States Patent Office 3,281,930
Patented Nov. 1, 1966

3,281,930
JOINING CLAD METAL PARTS
Stanley Fordham, West Kilbride, Scotland, assignor to Imperial Chemical Industries Limited, London, England, a corporation of Great Britain
Filed Oct. 24, 1963, Ser. No. 318,604
Claims priority, application Great Britain, Oct. 24, 1962, 40,279/62
6 Claims. (Cl. 29—470.1)

This invention relates to a method of joining together clad metal parts and particularly to a method of joining together separated portions of cladding metal on a substrate of base metal. The invention also relates to assembled laminar charges of cladding metal and explosive for use in this method.

Clad metal is used for the construction of vessels and chemical plant which are to be used in contact with materials which corrodes the cheaper metals but would be too costly if made from corrosion resistant metal. The cladding consists of a relatively thin layer of a corrosion resistant metal such as nickel or titanium, and the main structural metal which imparts most of the strength to the construction is a relatively thick layer of a cheaper metal such as mild steel. The cladding is usually superimposed on the base metal plate by rolling and articles are fabricated from portions of the clad plate by welding or other fusion process.

Hitherto the formation of satisfactory joints between clad metal parts has proved difficult. Often there remains at the joint discontinuities in the cladding layer which are sites for subsequent corrosion. Also with some combinations of cladding and base metals, the cladding metal diffuses into the base metal during the joining process and a weak joint results.

According to this invention a method of joining separate portions of cladding metal on a base metal substrate comprises placing a strip of cladding metal adjacent to the exposed surface of said portions so as to completely overlie the area of base metal separating said portions, covering said strip with a layer of explosive and detonating the explosive. The detonation of the explosive projects the strip with such force towards the portions of cladding material on the base metal that it becomes welded thereto so that a complete layer of cladding metal is formed over the base metal.

This invention provides a method of joining together separate pieces of clad metal which avoids the aforementioned disadvantages. For this purpose, edges of the pieces of clad metal are first joined together in known manner, a strip of cladding metal is placed over the joint and a portion of cladding metal on each side thereof and the strip is covered with a layer of explosive which is subsequently detonated. Preferably the cladding material should be removed from the base metal for a short distance back from the edges which are to be joined together so as to avoid any cladding metal diffusing into the joint. It is also preferable to smooth the surface of the joint before the strip of cladding metal is placed over it.

It is advantageous in carrying out the process of the invention to separate the explosive layer from the strip of cladding metal in order to avoid excessive damage to the surface of the strip. We have found that an interlayer of relatively soft material for example rubber or a soft metal such as mild steel provides sufficient protection for the surface of the cladding metal. When metal is used there is a tendency for the metal layers to stick together unless some precaution is taken. A layer of paper or cardboard placed between the strip and the protecting metal layer avoids sticking but it also has an undesirable attenuating effect on the detonation shock wave.

We find that sticking does not occur if, before detonating the explosive, the strip of cladding metal is, in transverse section, disposed at a small angle to the portion of the surface which it is to cover, and the explosive layer is detonated along the longitudinal edge nearer to said surface. This method has the further advantage that there is a space between the base metal surface and the portion of explosive immediately overlying it when that portion of explosive detonates. The tendency for the detonation to weaken a joint in the base metal is therefore less than when detonation occurs in close proximity to the surface. This method also results in improvement of the adhesion of the cladding strip to the surface since the air is thereby progressively expelled between the strip and the surface as the strip is propelled into place.

It is convenient to preassemble for use in the process of the invention, laminar assemblies comprising strips of cladding metal with an overlying layer of explosive and having, if desired, an interlayer of relatively soft material for example rubber or a soft metal such as mild steel to protect the surface of the strip. It will be understood, therefore, that the invention also includes such assemblies. These assemblies may be of a long length and supplied to the user in rolls from which any required length may be cut. Gelatinous explosives are particularly suitable for such assemblies.

The invention is further illustrated by the following examples which are described with reference to the accompanying drawing showing a perspective view of the assembled parts before the explosive is detonated.

EXAMPLE 1

In this example two ¼-inch thick mild steel plates clad with a 0.016 inch layer of titanium were joined together by the method of the invention.

The cladding within ¼-inch of the respective edges of the two plates which were to be joined together was removed and the edges joined by welding. Referring to the drawing, the welded plate 1, having a layer of cladding metal separated into two portions 2, 3, leaving a gap 4 along the welded joint 5 in which the base metal was exposed, was placed on a steel anvil 6.

A composite strip assembly was prepared which consisted of a 1½ inch wide and 0.016 inch thick cladding strip 7 of titanium covered with a 1/16 inch thick mild steel strip 8 of the same width and length which in turn was covered with a 1 inch thick layer of a nitroglycerine powder explosive 9 having a bulk strength of 54 percent blasting gelatine. A line of detonating fuse 10 was placed in contact with a longitudinal edge 11 of the explosive layer. This assembly was placed over the welded joint with the longitudinal edge 12 of the titanium cladding strip 7 adjacent to the detonating fuse in contact along its length with the titanium cladding portion 2 on one side of the joint, and the strip being at an angle of 10° to this surface. In this position the cladding strip 7 covered both the welded joint 5 and a portion of the titanium cladding 2, 3 along each side of the gap 4. The detonating fuse was initiated by a detonator 13 and the detonation wave bonded the titanium strip 7 to the mild steel strip in the gap 4 and to the portions of the cladding 2,3 which it overlay to form a continuous cladding layer of titanium over the surface of the plate 1.

EXAMPLE 2

The procedure in this example was the same as that carried out in Example 1 except that the mild steel interlayer 8 between the cladding strip 7 and the explosive 9 was omitted. The welded joint was satisfactorily covered but the exposed surface of the titanium strip 7 was roughened by the action of the explosive.

EXAMPLE 3

In this example, the process was the same as in Example 1 except that the titanium cladding strip 7 was placed in close contact with the two portions of cladding metal 2, 3 before initiation of the explosive 9. The explosive used was a ⅛" thick layer of a plastic explosive commercially available under the trade name "Metabel." A thin cardboard strip was interposed between the strips of mild steel 8 and titanium 7 to prevent sticking.

On detonation of the explosive satisfactory covering of the joint was obtained but the adhesion of the covering was inferior to that obtained in Examples 1 and 2.

EXAMPLE 4

The procedure in this example was the same as in Example 1 but the mild steel plate 1 had a 0.016 inch thick cladding of nickel separated into two portions 2, 3 by a gap 4; the cladding strip 7 was nickel and the layer 8 between the strip 7 and the explosive 9 was a 1/16 inch layer of rubber. There was no welded joint in the plate 1 at the gap 4.

On detonation of the explosive the nickel cladding strip was bonded to the portions of cladding 2, 3 and to the exposed base metal in the gap 4 to satisfactorily join the clad portions 2 and 3 to give a continuous nickel layer over the base metal.

EXAMPLE 5

The procedure in this example was the same as in Example 4 except that the cladding material on the plate 1 and the cladding strip 7 was 0.016 inch stainless steel.

On detonation of the explosive the cladding strip 7 was bonded to the cladding material on the plate 1 and to the exposed base metal in the gap to give a continuous layer of stainless steel over the mild steel base.

What I claim is:

1. A method of joining together separate pieces of clad metal, each of which comprises a base metal substrate having a cladding metal thereon and edges to be joined, said method comprising joining together the edges of the base metal substrates by fusion thereby forming a discontinuity in the cladding metal, placing a strip of said cladding metal over the discontinuity at the resulting joint so that said strip extends over a portion of the cladding metal on each side of the joint, covering the strip with a layer of explosive and detonating the explosive thereby bonding said strip of cladding metal to the cladding metal bonded to the substrate.

2. A method as claimed in claim 1 in which a protective layer of relatively soft material is placed between the strip of cladding metal and the layer of explosive.

3. A method as claimed in claim 2 in which the interposed layer is rubber or a soft metal such as mild steel.

4. A method as claimed in claim 3 in which the interposed layer is a soft metal and a layer of paper or cardboard is interposed between the layer of soft metal and the strip of cladding metal.

5. A method as claimed in claim 1 in which, before detonating the explosive, the strip of cladding metal is, in transverse section, disposed at a small angle to the portion of the surface which it is to cover, and the explosive layer is detonated along the longitudinal edge nearer to said surface.

6. A process as claimed in claim 5 in which the base metal substrate is mild steel and the cladding metal is titanium, nickel or stainless steel.

References Cited by the Examiner

UNITED STATES PATENTS

| 3,194,643 | 7/1965 | Ma et al. | 29—470.1 X |
| 3,197,855 | 8/1965 | Carter et al. | 29—497.5 X |
| 3,197,856 | 8/1965 | Pohhemas et al. | 29—421 X |
| 3,212,183 | 10/1965 | Burman et al. | 29—421 |

OTHER REFERENCES

Recent Advances in Metal Working with Explosives by Holtzman and Ruderhausen in Sheet Metal Industries, pp. 399–411.

CHARLIE T. MOON, *Primary Examiner.*

P. M. COHEN, *Assistant Examiner.*